United States Patent Office 3,320,312
Patented May 16, 1967

3,320,312
PHENYLSULFONYL CYCLO-ALKYLUREAS AND
THE PREPARATION THEREOF
Max V. Sigal, Jr., and Arthur M. Van Arendonk, Indianapolis, Ind., assignors to Eli Lilly and Company, Indianapolis, Ind., a corporation of Indiana
No Drawing. Filed Apr. 28, 1960, Ser. No. 25,209
4 Claims. (Cl. 260—553)

This invention relates to certain novel N-substituted phenylsulfonyl-N'-cyclo-alkylureas.

The compounds provided by this invention can be represented by the following formula:

$$CH_3-X-\langle\phantom{xx}\rangle-SO_2-NH-CO-NH-R$$

wherein R is cyclohexyl or cycloheptyl, and X is $$-\overset{O}{\underset{\|}{C}}-\text{ or }-CHOH-$$

The compounds represented by the above formula wherein X is a carbonyl grouping $$(-\overset{O}{\underset{\|}{C}}-)$$

are preferably prepared by reacting p-acetylphenylsulfonamide with cyclohexylisocyanate or with cycloheptylisocyanate in the presence of an alkaline carbonate. Compounds of this invention represented by the above formula wherein X is a secondary alcohol group $$(-CHOH-)$$

are most readily prepared by hydrogenating the carbonyl group of the corresponding p-acetylphenylsulfonylcycloalkylurea.

Also included within the scope of this invention are the nontoxic, cationic salts of the above-mentioned N-substituted phenylsulfonyl-N'-cyclo-alkylureas. The salts can be formed by reacting the phenylsulfonylurea with a suitable base or basic salt such as ammonium hydroxide, potassium hydroxide, magnesium hydroxide, sodium carbonate, and the like. Among the preferred nontoxic, cationic salts are the sodium, potassium, calcium, magnesium, and ammonium salts.

Both the N-substituted phenylsulfonyl-N'-cyclo-alkylureas and their nontoxic, cationic salts are white, high-melting solids. The ureas themselves are soluble in most polar organic solvents, whereas the cationic salts are soluble in aqueous solvents.

The compounds of this invention can be prepared by methods other than the preferred methods disclosed above. For example, an alternative procedure for the preparation of compounds represented by the above formula wherein X is a carbonyl grouping, comprises the reaction of p-acetylphenylsulfonamide with ethylchlorocarbonate to form the corresponding urethane, which is in turn reacted with cyclohexyl or cycloheptyl amine to give the desired sulfonylurea. In addition, there are available the reaction of p-acetylphenylsulfonamide with cyclohexyl or cycloheptyl urethane, the reaction of p-acetylphenylsulfonylisocyanate with the cyclo-alkyl amine, as well as the reaction of two molecules of p-acetylphenylsulfonamide with phosgene to yield a disulfonylurea, which is pyrolyzed in the presence of cyclohexyl or cycloheptyl amine. All of these reactions yield the desired N-p-acetylphenylsulfonyl-N'-cyclo-alkylurea. Compounds represented by the above formula in which X is a secondary alcohol group, can also be prepared by reducing the p-acetyl group of the sulfonamide, disulfonylurea or sulfonylcarbamate to an α-hydroxyethyl group and, if necessary, protecting the hydroxyl group during subsequent reactions of the type outlined above utilized for the preparation of the p-acetylsulfonylurea compounds. Suitable protecting groups include acyl and carbamate groups, either of which can readily be removed by simple hydrolysis to give the desired hydroxyl-containing sulfonylurea.

The novel compounds of this invention have hypoglycemic properties which make them useful anti-diabetic agents. Thus, for example, adequate regulation of the blood sugar levels of diabetics can be secured by the oral administration of N-p-acetylphenylsulfonyl-N'-cyclohexylurea in daily dosage amounts in the range of about 250 to about 1000 mg. Clinical tests have not shown any serious side effects such as jaundice and hepatotoxicity which have resulted from the administration of certain other oral hypoglycemic agents.

The compounds of this invention preferably are administered orally in one of the customary oral dosage forms, for example, compressed tablets or filled capsules, which contain the desired amount of medicament together with the customary binders, fillers and other excipients. Illustratively, N - p - acetylphenylsulfonyl - N' - cyclohexylurea can be processed into tablets suitable for oral administration by the following procedure: 1424 g. of the cyclohexylurea are mixed with 399 g. of starch, 20 g. of granular gelatin, and 37 g. of magnesium stearate, and the mixture is pressed into scored tablets, of such size that each tablet contains 500 mg. of N-p-acetylphenylsulfonyl-N'-cyclohexylurea.

This invention is further illustrated by the following examples.

EXAMPLE 1

Preparation of p-acetylbenzenesulfonamide 100 g. of p-aminoacetophenone were dissolved in a solvent mixture containing 165 ml. of 12 N hydrochloric acid and 165 ml. of glacial acetic acid. The mixture was cooled with stirring to about 0° C. A solution containing 56.2 g. of sodium nitrite and 175 ml. of water was added dropwise with stirring to the acidic solution while maintaining the temperature below 5° C. After the addition had been completed, the acidic solution containing p-acetylphenyldiazonium chloride formed in the above reaction was added dropwise with stirring to a mixture of 530 ml. of glacial acetic acid and 530 ml. of benzene which had been previously cooled, and the cooled solution saturated with sulfur dioxide and to which had been added 34 g. of cupric chloride dihydrate. After the addition had been completed, the reaction mixture was stirred at about 40° C. for three hours, and was then poured into 3000 ml. of an ice-water mixture. The benzene layer containing p-acetylbenzenesulfonyl chloride formed in the above reaction was separated, and the acidic aqueous phase was extracted twice with 250 ml. portions of benzene. The benzene layers were combined, the combined extracts were filtered, and the benzene was evaporated from the resulting filtrate in vacuo. The solid residue comprising p-acetylbenzenesulfonyl chloride was dissolved in 100 ml. of dioxane, and the solution was added to 200 ml. of 14 percent aqueous ammonium hydroxide. The resulting solution was stirred overnight at ambient room temperature. The p-acetylbenzenesulfonamide thus prepared was collected by filtration. Recrystallization of the filter cake from aqueous ethanol yielded purified p-acetylbenzenesulfonamide melting at about 176–179° C.

EXAMPLE 2

Preparation of N-p-acetylphenylsulfonyl-
N'-cyclohexylurea

A reaction mixture consisting of 32.7 g. of p-acetylbenzenesulfonamide and 64 g. of anhydrous potassium carbonate in 350 ml. of anhydrous acetone was stirred at refluxing temperature for about one and one-half hours, thus forming the potassium salt of p-acetylbenzenesulfonamide. 30.9 g. of cyclohexylisocyanate were added dropwise to the reaction mixture. Refluxing and stirring were continued during the course of the addition and for an additional 16 hours. The acetone was removed by evaporation in vacuo, and about 750 ml. of water were added to dissolve the resulting residue. The solution was filtered. The potassium salt of N-p-acetylphenylsulfonyl-N'-cyclohexylurea formed in the above reaction, being water soluble, passed into the filtrate. Acidification of the filtrate with 6 N aqueous hydrochloric acid caused the precipitation of N-p-acetylphenylsulfonyl-N'-cyclohexylurea which was collected by filtration. Recrystallization of the filter cake from 90 percent aqueous ethanol yielded purified N-p-acetylphenylsulfonyl-N'-cyclohexylurea melting at about 188–190° C.

EXAMPLE 3

*Preparation of ethyl N-(p-acetylphenylsulfonyl)carbamate*

65 g. of ethyl chloroformate were added dropwise with stirring to a reaction mixture containing 89 g. of p-acetylbenzenesulfonamide and 162 g. of anhydrous potassium carbonate in 550 ml. of anhydrous acetone. After the addition had been completed, the reaction mixture was heated at refluxing temperature for about 18 hours, after which time it was cooled and was filtered. The filter cake containing the potassium salt of ethyl N-(p-acetylphenylsulfonyl)carbamate formed in the above reaction was dissolved in about 1.4 l. of water. The resulting solution was filtered to remove insoluble impurities, and was acidified to a pH of about 2 with 12 N hydrochloric acid, thus precipitating ethyl N-(p-acetylphenylsulfonyl)carbamate which was then collected by filtration. Recrystallization of the filter cake from an ethanol-water mixture yielded purified ethyl N-(p-acetylphenylsulfonyl)carbamate melting at about 123–125° C.

EXAMPLE 4

*Alternative preparation of N-p-acetylphenylsulfonyl-N'-cyclohexylurea*

About 30 g. of ethyl N-p-acetylphenylsulfonylcarbamate were dissolved in about 500 ml. of warm toluene. A solution of 12.5 g. of cyclohexylamine dissolved in 25 ml. of toluene was added dropwise to the carbamate solution while the reaction mixture was heated to refluxing temperature. After the addition of the cyclohexylamine had been completed, the reaction mixture was heated at refluxing temperature for an additional 4 hours, and was then allowed to stand at ambient room temperature for another 16 hours. N-p-acetylphenylsulfonyl-N'-cyclohexylurea formed in the above reaction was collected by filtration. The filter cake was dissolved in boiling ethanol and the resulting solution was filtered. The filtrate was diluted with water and was acidified with 12 N hydrochloric acid. Cooling of the solution yielded crystalline N-p-acetylphenylsulfonyl-N'-cyclohexylurea which was collected by filtration. After two fold recrystallization from aqueous ethanol, the compound melted at about 182–183° C.

EXAMPLE 5

*Preparation of N-p-acetylphenylsulfonyl-N'-cycloheptylurea*

4.85 g. of ethyl N-(p-acetylphenylsulfonyl)carbamate were dissolved in 60 ml. of refluxing toluene. A solution containing 4.5 g. of cycloheptylamine in 20 ml. of toluene was added thereto in dropwise fashion. After the addition had been completed, the reaction mixture was heated to refluxing temperature for 4 hours. The toluene was removed by evaporation in vacuo. The residue comprising N-p-acetylphenylsulfonyl-N'-cycloheptylurea formed in the above reaction was dissolved in ethanol, 50 ml. of water were added, and the solution was made acid to litmus by the addition of 12 N hydrochloric acid. Chilling of the solution yielded crystals of N-p-acetylphenylsulfonyl-N'-cycloheptylurea. The crystals were separated by filtration, and after two-fold recrystallization from aqueous acetone, melted at about 156–157° C.

EXAMPLE 6

*Preparation of N-p-(α-hydroxyethyl)phenylsulfonyl-N'-cyclohexylurea*

1 g. of N-p-acetylphenylsulfonyl-N'-cyclohexylurea was dissolved in 100 ml. of ethanol to which 10 ml. of water had been added. About 1 g. of 5 percent palladium-on-carbon catalyst was added, and the urea was hydrogenated under a hydrogen pressure of about 45 p.s.i. After the theoretical quantity of hydrogen had been absorbed, the hydrogenation mixture was filtered to remove the catalyst, and the filtrate was evaporated to dryness in vacuo. The residue comprising N-p-(α-hydroxyethyl)phenylsulfonyl-N'-cyclohexylurea formed in the above hydrogenation melted at about 150–152° C. after two-fold recrystallization from aqueous ethanol.

For hydrogenations using larger amounts of N-p-acetylphenylsulfonyl-N'-cyclohexylurea, a mixture of ethanol and dioxane can be employed in place of the aqueous ethanol used in the above example.

N-p-(α-hydroxyethyl)phenylsulfonyl-N'-cycloheptylurea can be prepared by hydrogenating N-p-acetylphenylsulfonyl-N'-cycloheptylurea with a palladium-on-carbon catalyst by the procedure set forth above.

EXAMPLE 7

*Preparation of the sodium salt of N-p-acetylphenylsulfonyl-N'-cyclohexylurea*

1 g. of N-p-acetylphenylsulfonyl-N'-cyclohexylurea was suspended in 20 ml. of water, and 2.96 ml. of a 1 N sodium hydroxide solution were added. The solution was evaporated in vacuo, leaving the sodium salt of N-p-acetylphenylsulfonyl-N'-cyclohexylurea as a white, amorphous solid.

The above reaction can be repeated with N-p-acetylphenylsulfonyl-N'-cycloheptylurea and N-p-(α-hydroxyethyl)phenylsulfonyl-N'-cyclohexylurea, to form their respective sodium salts.

Alternatively, magnesium hydroxide, ammonium hydroxide, potassium hydroxide, and the like can be used in place of sodium hydroxide to provide the corresponding magnesium, ammonium, potassium, and similar salts, respectively, of the substituted sulfonylurea. If desired, soluble carbonates such as sodium carbonate and potassium carbonate can be used in place of the hydroxides.

We claim:
1. A compound of the class consisting of an N-substituted phenylsulfonyl-N'-cyclo-alkylurea and its salts formed with nontoxic cations, said sulfonylurea being of the following formula:

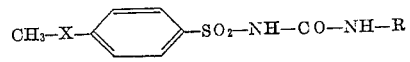

wherein R is a member of the group consisting of cyclohexyl and cycloheptyl, and X is a member of the group consisting of

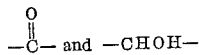

2. N-p-acetylphenylsulfonyl-N'-cyclohexylurea.
3. N-p-acetylphenylsulfonyl-N'-cycloheptylurea.
4. N-p-(α-hydroxyethyl)phenylsulfonyl-N'-cyclohexylurea.

No references cited.

JOHN D. RANDOLPH, *Primary Examiner.*